United States Patent
Sanji et al.

(10) Patent No.: US 8,073,421 B2
(45) Date of Patent: Dec. 6, 2011

(54) RADIO SIGNAL RECEIVER DEVICE

(75) Inventors: Kenichiro Sanji, Okazaki (JP); Akira Takaoka, Okazaki (JP); Hiromichi Naito, Okazaki (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 384 days.

(21) Appl. No.: 12/496,014

(22) Filed: Jul. 1, 2009

(65) Prior Publication Data

US 2010/0003940 A1    Jan. 7, 2010

(30) Foreign Application Priority Data

Jul. 1, 2008  (JP) .................................. 2008-172422

(51) Int. Cl.
*H04B 1/16*    (2006.01)

(52) U.S. Cl. .................... 455/343.5; 455/254; 455/343.2

(58) Field of Classification Search .... 455/226.1–226.2, 455/254, 343.1–343.5
See application file for complete search history.

(56) References Cited

U.S. PATENT DOCUMENTS

| 5,220,687 A * | 6/1993 | Ichikawa et al. ............... 455/254 |
| 7,149,480 B2 * | 12/2006 | Miyahara ......................... 455/78 |
| 2008/0232431 A1 | 9/2008 | Sanji et al. |
| 2010/0029235 A1 * | 2/2010 | Bouillet ..................... 455/226.2 |

FOREIGN PATENT DOCUMENTS

| JP | 4-286228 | 10/1992 |
| JP | 2007-186065 | 7/2007 |

* cited by examiner

*Primary Examiner* — Christian Hannon
(74) *Attorney, Agent, or Firm* — Nixon & Vanderhye PC

(57) ABSTRACT

A radio signal detector includes first and second detector circuits. The first detector circuit has a higher detection sensitivity to detect a radio signal earlier than the second detector circuit. The second detector circuit has a lower detection sensitivity to detect the radio signal accurately. When the second detector circuit detects the radio signal, it starts up a microcomputer. When the first detector circuit detects the radio signal, a time counter starts to count time. After being started up, the microcomputer acquires a time difference between the radio signal detection by the first detector circuit and the start-up. The microcomputer determines time of radio signal transmission by a radio signal transmitter device based on the determined time difference, and outputs control information after an elapse of a predetermined time.

6 Claims, 6 Drawing Sheets

RADIO SIGNAL RECEIVER DEVICE

CROSS REFERENCE TO RELATED APPLICATION

This application is based on and incorporates herein by reference Japanese Patent Application No. 2008-172422 filed on Jul. 1, 2008.

FIELD OF THE INVENTION

The present invention relates to a radio signal receiver device, which starts up a control circuit in response to detection of a radio signal transmitted from a radio signal transmitter device based on a signal level of a received signal.

A conventional radio signal receiver device includes a demodulator circuit and a control circuit such as a microcomputer having a central processing unit (CPU). The demodulator circuit demodulates data transmitted in a radio signal transmitted from a transmitter device and received by a receiver antenna. The CPU executes predetermined control processing based on demodulated data.

It is proposed in the following patent document 1 to provide a detector circuit in a radio signal receiver device for reducing electric power consumption. Specifically, the detector circuit is configured to detect a signal level (electric field strength) of a radio signal received by a receiver antenna, and detects reception of a radio signal when the signal level of the received signal exceeds a predetermined threshold level. This detector circuit starts up or activates the control circuit when the reception of the radio signal is detected. The control circuit is controlled to a sleep state after the control circuit completes the control processing.

The detector circuit charges a capacitor by wave-detecting and rectifying the received signal by semiconductor elements such as diodes, and compares a charge voltage of the capacitor with a threshold voltage by a comparator. The detector circuit thus checks whether a radio signal is received.

This detector circuit however takes some time to detect the reception of the radio signal from the start of reception of the radio signal by the receiver antenna, because the capacitor need be charged to attain the threshold voltage. This period of time (detection delay time) varies with a distance up to the radio signal transmitter device, multi-path fading and the like.

If the detection delay time varies, a period of time from the start of transmission of the radio signal of the radio signal transmitter device to the start-up of the control circuit for executing the control processing based on the received data also varies. As a result, it often becomes impossible to execute the control processing, which includes processing of transmission of response data in correspondence to the received data for example.

It is possible to suppress variation in the detection delay time by shortening the detection delay time. To shorten the detection delay time, the following patent document 2 proposes to switch over, in a device having a band-pass filter in an input path of a received signal, bandwidths of the band-pass filter between received signal level detection time and data demodulation time. The bandwidth of the band-pass filter is widened in the received signal level detection time than in the received data demodulation time.
Patent document 1: JP 2007-186065A
Patent document 2: JP 2780725 (JP 4-286228A)

This proposed device, which switches over the bandwidths to shorten the detection delay time, however, is required to have a plurality of band-pass filters having different bandwidths and select one of the band-pass filters. This results in increase of circuit size and cost.

It is also proposed to increase radio signal detection sensitivity of the detector circuit by decreasing the size of the capacitor or the threshold voltage of the comparator, which are provided in the detector circuit, for shortening the detection delay time without switchover of the bandwidths of the band-pass filter.

If the radio signal detection sensitivity of the detector circuit is increased, reception of a radio signal is detected not only when the radio signal is properly received by the receiver antenna but also when external noise is superimposed on the received signal from the receiver antenna. If the external noise is detected as a part of a received radio signal, the control circuit will be started up unnecessarily.

SUMMARY OF THE INVENTION

It is therefore an object of the present invention to provide a radio signal receiver device, which protects a control circuit from being started up by erroneous detection of a radio signal and enables execution of control processing of the control circuit at proper time corresponding to start of transmission of the radio signal from a radio signal transmitter device.

According to one aspect of the present invention, a radio signal receiver device is configured to receive a radio signal transmitted from a radio signal transmitter device, to restore, by processing a received signal, data transmitted from the radio signal transmitter and included in the received signal, and to execute control processing in correspondence to transmitted data. The radio signal receiver device is configured to detect first reception of the radio signal based on a signal level of the received signal, to start up the control processing by detecting second reception of the radio signal based on a signal level of the received signal at a later time than the first reception. The radio signal receiver device is further configured to count a time difference between the first and the second reception of the radio signal, and to detect a reception start time of the radio signal by the receiver antenna based on the time difference, after being started up and execute the control processing based on the reception start time.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to one embodiment and its modifications.

Figure 1:
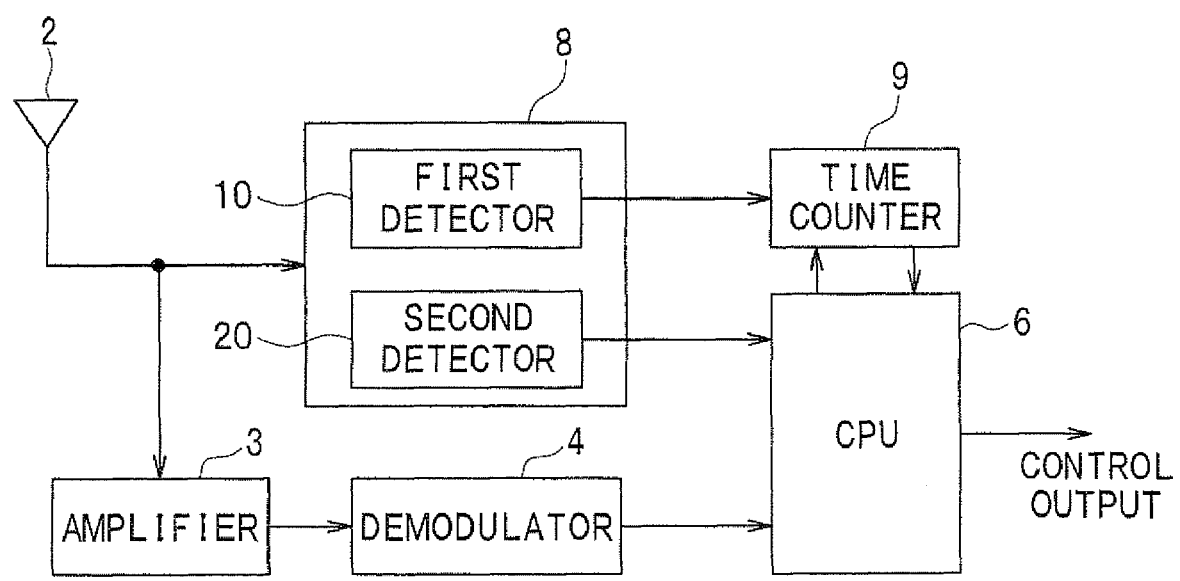
FIG. 1 is a block diagram showing a radio signal receiver device according to one embodiment of the present invention.

Referring to FIG. 1, a radio signal receiver device includes a receiver antenna 2, an amplifier 3, a demodulator 4 and a control circuit, which is denoted as a CPU of a microcomputer 6. The receiver antenna 2 is for receiving a radio signal transmitted from a radio signal transmitter device (not shown). The amplifier 3 is for amplifying a received signal, which is produced from the receiver antenna 2. The demodulator 4 is for demodulating transmitted data from an amplified received signal of the amplifier 3. The transmitted data is transmitted from the transmitter device, which modulates a carrier wave according to a predetermined signal modulation method. The microcomputer 6, operating as a control circuit, executes predetermined processing based on demodulated data produced from the demodulator 4.

The amplifier 3 is provided with a filter for filtering out unnecessary signal components from the received signal of the receiver antenna 2 in addition to an amplifier circuit for amplifying the received signal. This filter removes signal components (noise components, etc.) other than the radio signal transmitted from the radio signal transmitter device.

The radio signal receiver device further includes a radio signal detector circuit 8 and a time counter 9. The radio signal detector circuit 8 is for detecting reception of the radio signal of the radio signal transmitter device by the receiver antenna 2 based on a signal level of the received signal produced from the receiver antenna 2.

The radio signal detector circuit 8 includes two detector circuits, that is, a first detector circuit 10 and a second detector circuit 20, which have different detection sensitivities. The detection sensitivity of the first detector circuit 10 is higher than that of the second detector circuit 20. The first detector circuit 10 is configured to output a first detection signal to the time counter 9 upon detecting reception of the radio signal. The time counter 9 is configured to start counting time in response to the first detection signal. The time counter 9 outputs counted time, which elapses after the start of time-counting, upon request from the microcomputer 6.

The second detector circuit 20 is configured to output a second detection signal as a start-up or activation signal to the microcomputer 6 upon detecting reception of the radio signal, so that the microcomputer 6 is started up to operate. The microcomputer 6 is configured to execute start time processing (FIG. 3) for acquiring the demodulated data of the demodulator 4 and then execute predetermined control processing based on the acquired demodulated data.

The microcomputer 6 is further configured to make transition from a normal operation state to a sleep state, when the demodulated data is not supplied from the demodulator 4 any more for a predetermined sleep determination time, that is, the radio signal of the radio signal transmitter device is not received any more for a predetermined time, after being started up. After the transition to the sleep state, the microcomputer 6 continues to be inoperative until the second detection signal (start-up signal) is applied from the second detector circuit 20.

Figure 2:
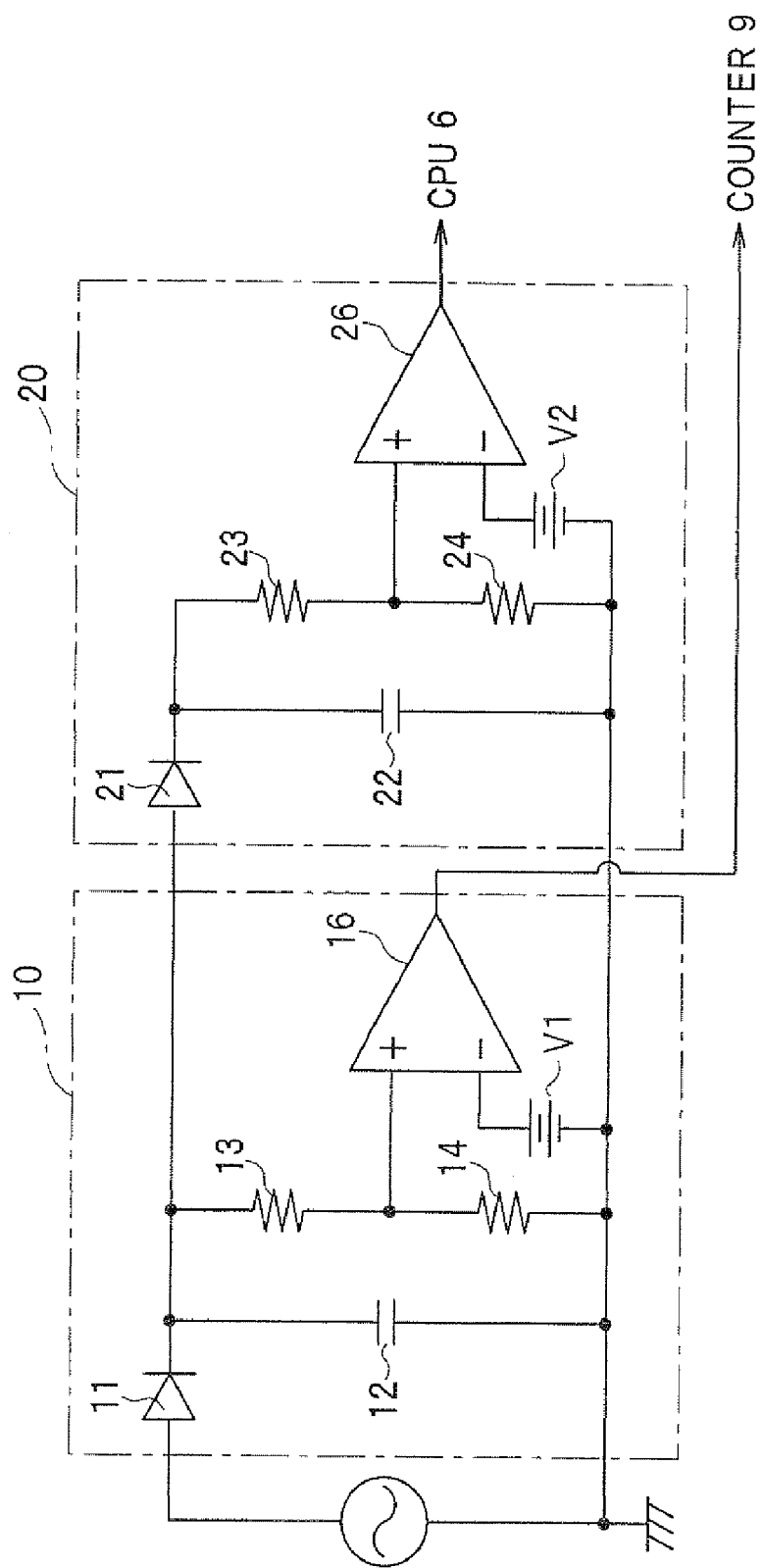
FIG. 2 is an electric circuit diagram showing a radio signal detector circuit in the embodiment.

The radio signal detector circuit 8 is configured as shown in FIG. 2. Specifically, the first detector circuit 10 and the second detector circuit 20 include diodes 11 and 21, capacitors 12 and 22, resistors 13, 14 and 23, 24, and comparators 16 and 26, respectively. The diodes 11 and 21 are for wave-detecting and rectifying the received signals of the receiver antenna 2. The capacitors 12 and 22 are for being charged by wave-detected and rectified signals of the diodes 11 and 21, respectively. The resistors 13, 14 and 23, 24 are for dividing charged voltages (capacitor voltages) of the capacitors 12 and 22, respectively. The comparators 16 and 26 are for comparing the divided capacitor voltages with predetermined threshold voltages V1 and V2, respectively. The comparators 16 and 26 determine reception of the radio signal by the receiver antenna 2, when the divided capacitor voltages exceed the threshold voltages V1 and V2, respectively.

The first detector circuit 10 is provided as a pre-stage circuit in the signal input path between the receiver antenna 2 and the second detector circuit 20. The capacitor 12 in the first detector circuit 10 has a smaller capacitance than the capacitor 22 of the second detector circuit 20. The first detector circuit 10 and the second detector circuit 20 are in the same configuration except the capacitances of the capacitors 12 and 22.

Since the first detector circuit 10 has higher sensitivity in detecting the radio signal than the second detector circuit 20, the first detector circuit 10 detects the radio signal at earlier time than the second detector circuit 20. Since the second detector circuit 20 has a lower sensitivity in detecting the radio signal than the first detector circuit 10, it takes more time to detect the radio signal than the first detector circuit 10 but can detect the radio signal more stably than the first detector circuit 10 without being affected by external noises.

Figure 3:
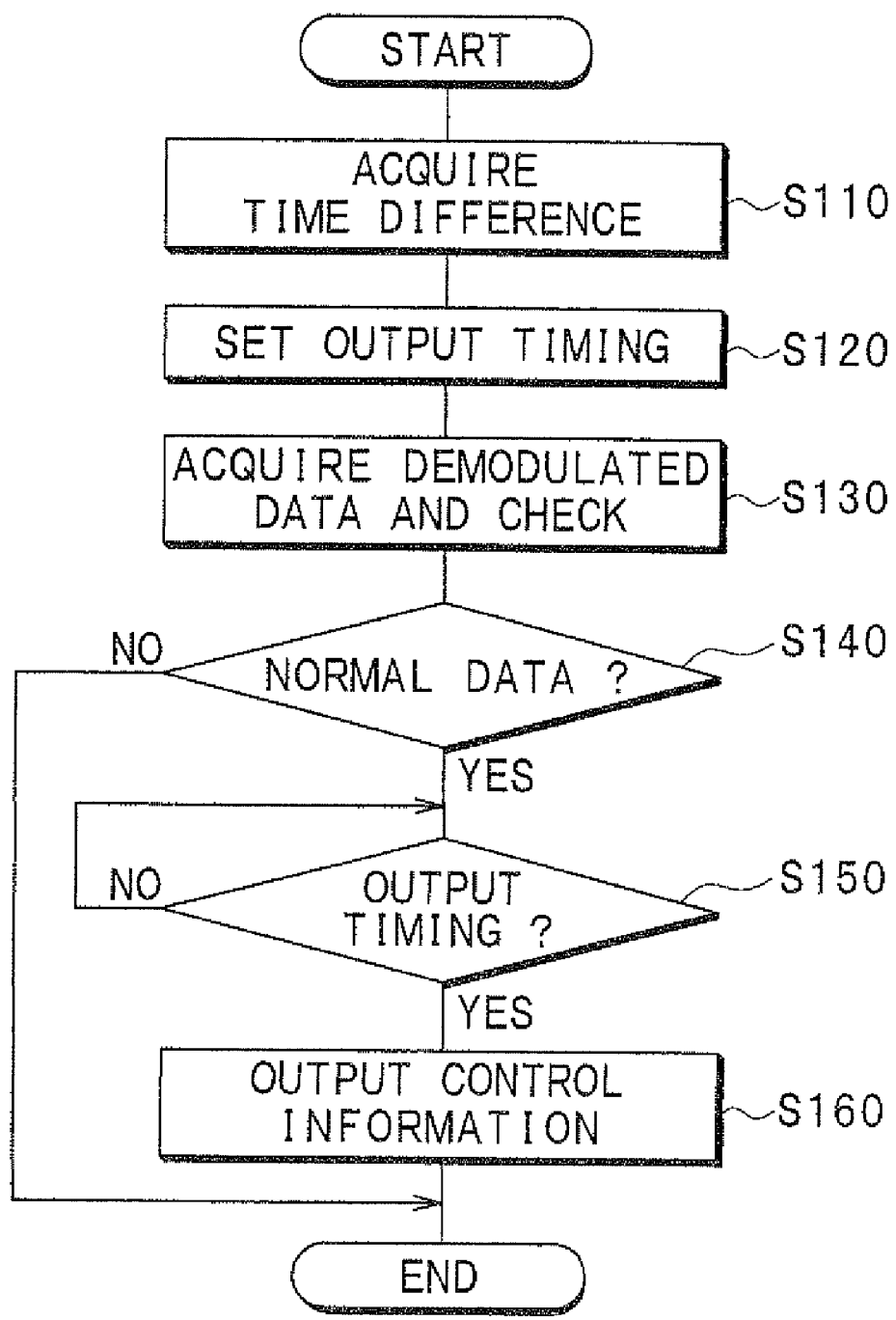
FIG. 3 is a flowchart showing start-time processing executed by a CPU in the embodiment.

The start-time processing, which the microcomputer 6 executes immediately after being started up by the start-up signal of the second detector circuit 20, is shown in FIG. 3. As shown in FIG. 3, the microcomputer 6 acquires at S110 after the start-up acquires the counted time from the time counter 9 by outputting a request of supply of the counted time to the time counter 9.

Figure 4:
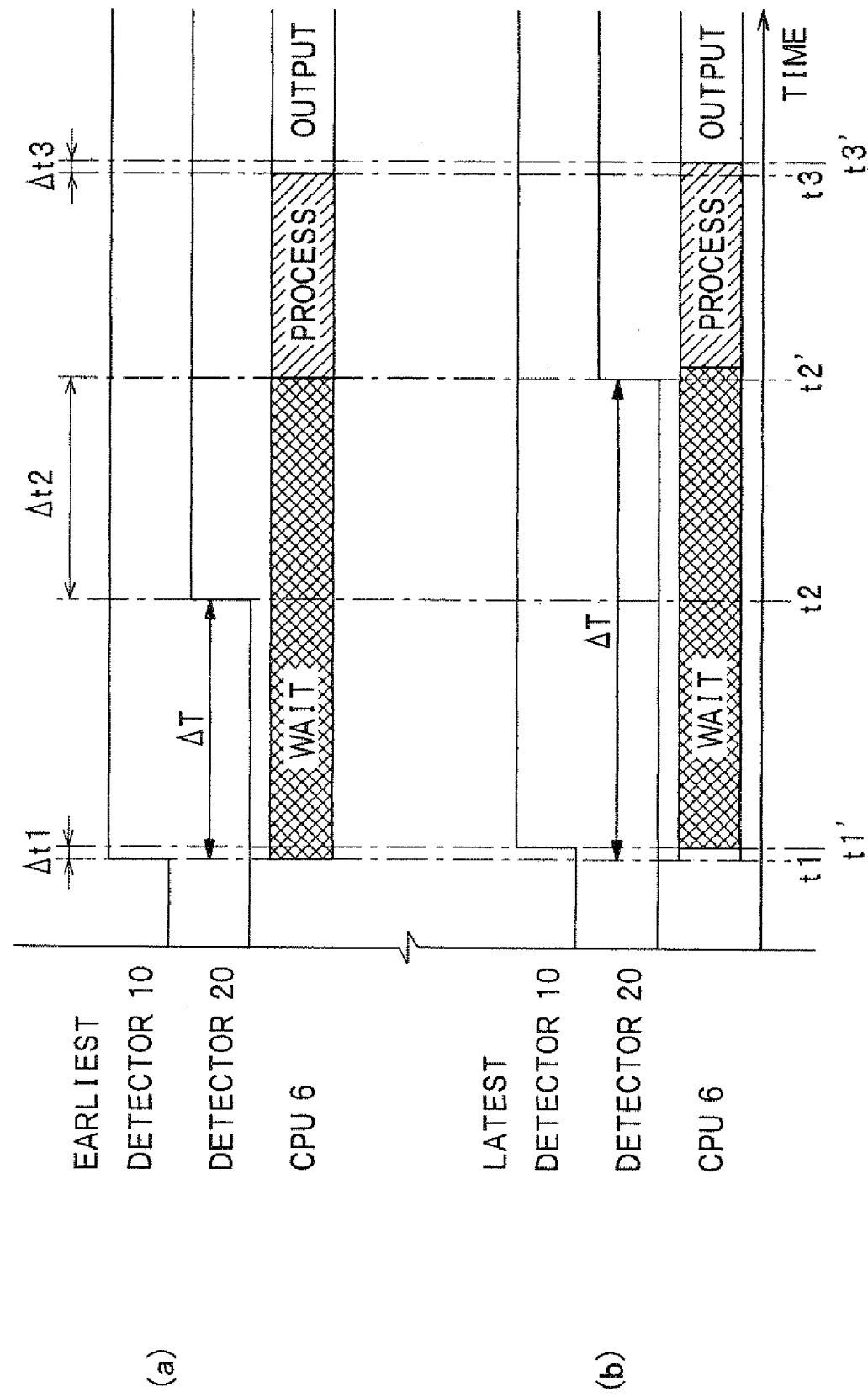
FIG. 4 is a time chart showing a relation between time of radio signal detection of the detector circuit and time of outputting a control signal of the CPU in the embodiment.

As shown in (a) and (b) of FIG. 4, this counted time represents a time difference ΔT from a radio signal detection time t1, t1' of the first detector circuit 10 to a radio signal detection time t2, t2' of the second detector circuit 20. This counted time acquired at S110 is referred to as time difference information.

At S120, the microcomputer 6 sets an output time (time t3, t3') of control information corresponding to the received data. Here, the microcomputer 6 calculates as a reception start time a first detection time (time t1, t1') of the first detector circuit 10 based on the time difference information acquired at S110 and the start-up time of the microcomputer 6 (time t2, t2'). The microcomputer 6 calculates the output time t3 and t3' by adding to the first reception time t1, t1' a predetermined fixed wait time and a predetermined fixed processing time of the microcomputer 6.

At S130, the microcomputer 6 acquires the demodulated data from the demodulator 4 and compares the acquired demodulated data with predetermined reference data thereby to check whether the data received this time is regular data provided for the subject radio signal receiver device.

At S140, the microcomputer 6 further checks whether the received data is normal based on a check result of S130. If the received data is not normal, the microcomputer 6 ends the start-time processing. If the received data is normal, the microcomputer 6 checks at S150 whether it is the output time set at S120. If it is not the output time, S150 is repeated and no control signal including control information is outputted. If it is the output time, the microcomputer 6 outputs at S160 the control information calculated in correspondence to the received data to an external device (not shown), thus ending the start-time processing.

As described above, when the receiver antenna 2 receives no radio signal from the radio signal transmitter device for more than the predetermined time, the microcomputer 6 transitions to the sleep state. When the second detector circuit 20 thereafter detects the reception of the radio signal (time t2, t2'), the start-up signal is outputted to start up the microcomputer 6.

The microcomputer 6, after being started up, executes the start-time processing. In this start-time processing, the microcomputer 6 acquires the demodulated data (received data) from the demodulator 4 at S130, and outputs the control information corresponding to the received data at S160 only when the received data is normal. The microcomputer 6 controls the output time of the control information to the time t3, t3', which is a predetermined time (wait time plus processing time) later after the time t1, t1' of detection of the radio signal by the first detector circuit 10.

Therefore, the time t3, t3' of the microcomputer 6 to output the control information to the external device is controlled to generally the same time, even if the interval of time from the start of transmission of the radio signal by the radio signal transmitter device to the start-up of the microcomputer 6 is varied due to variation in the electric field of the radio signal transmitted to the receiver antenna 2. This variation is caused by distance of the propagation path of the radio signal from the transmitter device to the radio signal receiver device, multi-path fading in the propagation path and the like.

In FIG. 4, (a) shows a case in which the radio signal is detected at the earliest time by the first detector circuit 10 and the second detector circuit 20 due to strong electric field strength of the radio signal arriving at the receiver antenna 2, and (b) shows a case in which the radio signal is detected at the latest time by the first detector circuit 10 and the second detector circuit 20 due to low electric field strength of the radio signal arriving at the receiver antenna 2.

As understood from FIG. 4, the difference $\Delta t1$ in times t1 and t1' of detection of the radio signal by the first detector circuit 10 is minimized and small, because the time required to charge the capacitor 12 after the reception of the radio signal is small due to small capacitance of the capacitor 12 and the high radio signal detection sensitivity of the first detector circuit 10.

The difference $\Delta t2$ in times t2 and t2' of detection of the radio signal by the second detector circuit 20 is much larger than the difference $\Delta t1$, because the time required to charge the capacitor 22 after the reception of the radio signal is large due to large capacitance of the capacitor 22 and the low radio signal detection sensitivity of the second detector circuit 20.

Therefore, the microcomputer 6 is prevented from being started up in response to erroneous detection of the radio signal, by starting up the microcomputer 6 in response to the detection of the radio signal by the second detector circuit 20. Further, by setting the output time of the control information based on the detection time of the radio signal by the first detector circuit 10, the control information is outputted after elapse of a generally uniform time from the start of transmission of the data from the transmitter device.

If the radio signal receiver device is applied in a control system (not shown) to control a control object (not shown) in response to a control command from a transmitter device (not shown), a response time required for the control object to respond to the control command after the transmission of the control command can be controlled to generally the same time. This is advantageous to enhance precision of control.

If the radio signal receiver device is applied in a communications system (not shown) to transmit response data through an external device (not shown) in response to transmitted data of a radio signal transmitter device (not shown), time required from start of transmission of data by the radio signal transmitter device to reception of response data by the radio signal transmitter device can be controlled to generally the same. This is advantageous to simplify response data receiving operation of the transmitter device.

Further, since the microcomputer 6 is not started up unnecessarily by erroneous detection of the radio signal, electric power required for the microcomputer 6 to operate can be reduced.

In the foregoing embodiment, the demodulator 4, the microcomputer 6, the time counter 9, the first detector circuit 10 and the second detector circuit 20 operate as restoring means, control means, time difference counting means, first detection means and second detection means, respectively.

The foregoing embodiment may be modified in the following ways.

Figure 5:
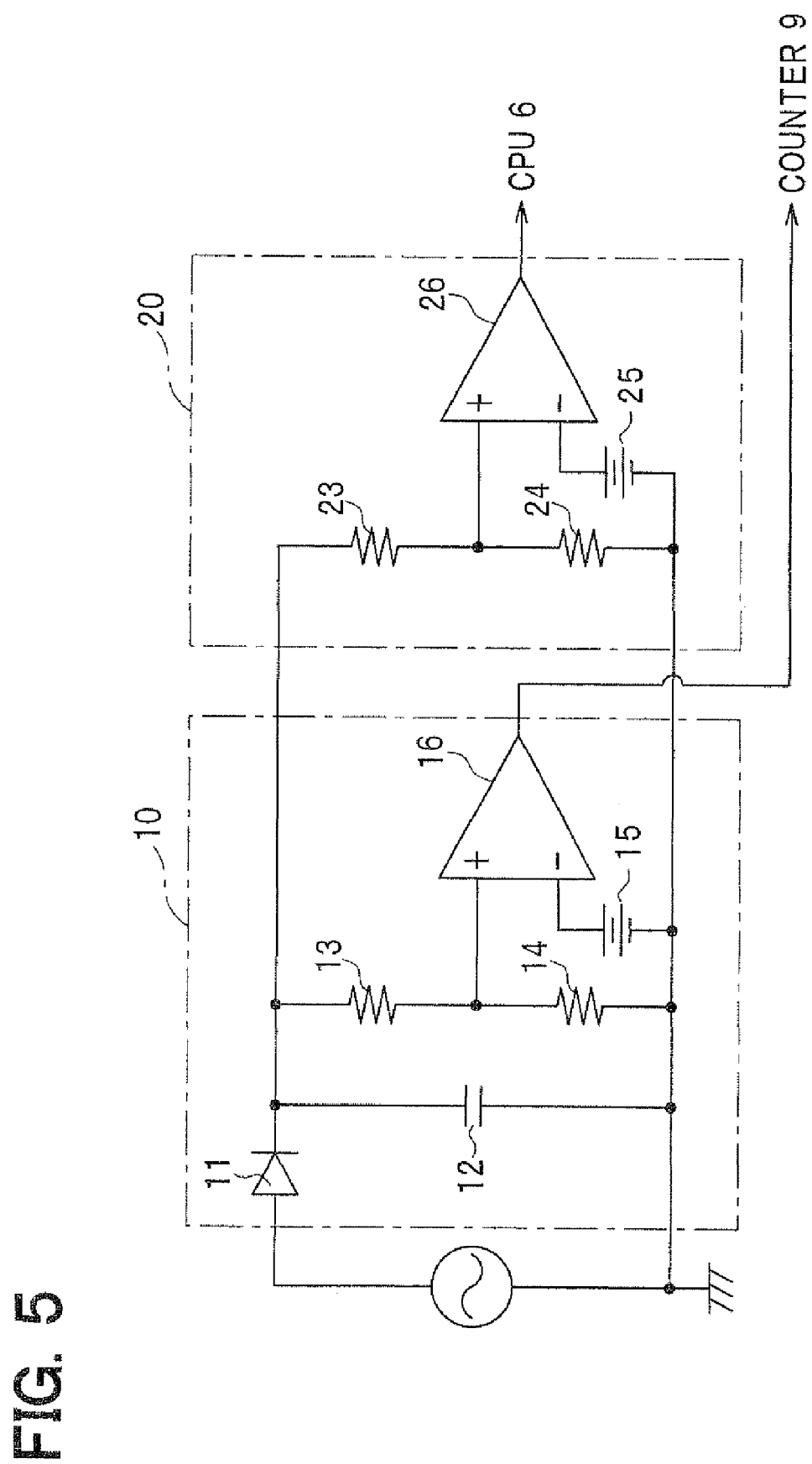
FIG. 5 is an electric circuit diagram showing a radio signal detector circuit according to a modified embodiment.

As one modification, as shown in FIG. 5, the diode 11 and the capacitor 12 charged through the diode 11 may be shared by both of the first detector circuit 10 and the second detector circuit 20, thereby eliminating the diode 21 and the capacitor 22 of the second detector circuit 20 shown in FIG. 2.

In this case, since the first detector circuit 10 and the second detector circuit 20 are configured with the dividing resistors 13, 14, 23, 24 and the comparators 16, 26, the radio signal detector circuit 8 can be simplified in configuration.

To maintain the first detector circuit 10 to be more sensitive to the radio signal than the second detector circuit 20, the threshold voltage V1 provided by a first voltage source 15 for the comparator 16 may be set to be lower than the threshold voltage V2 provided by a second voltage source 25 for the comparator 26.

Figure 6:
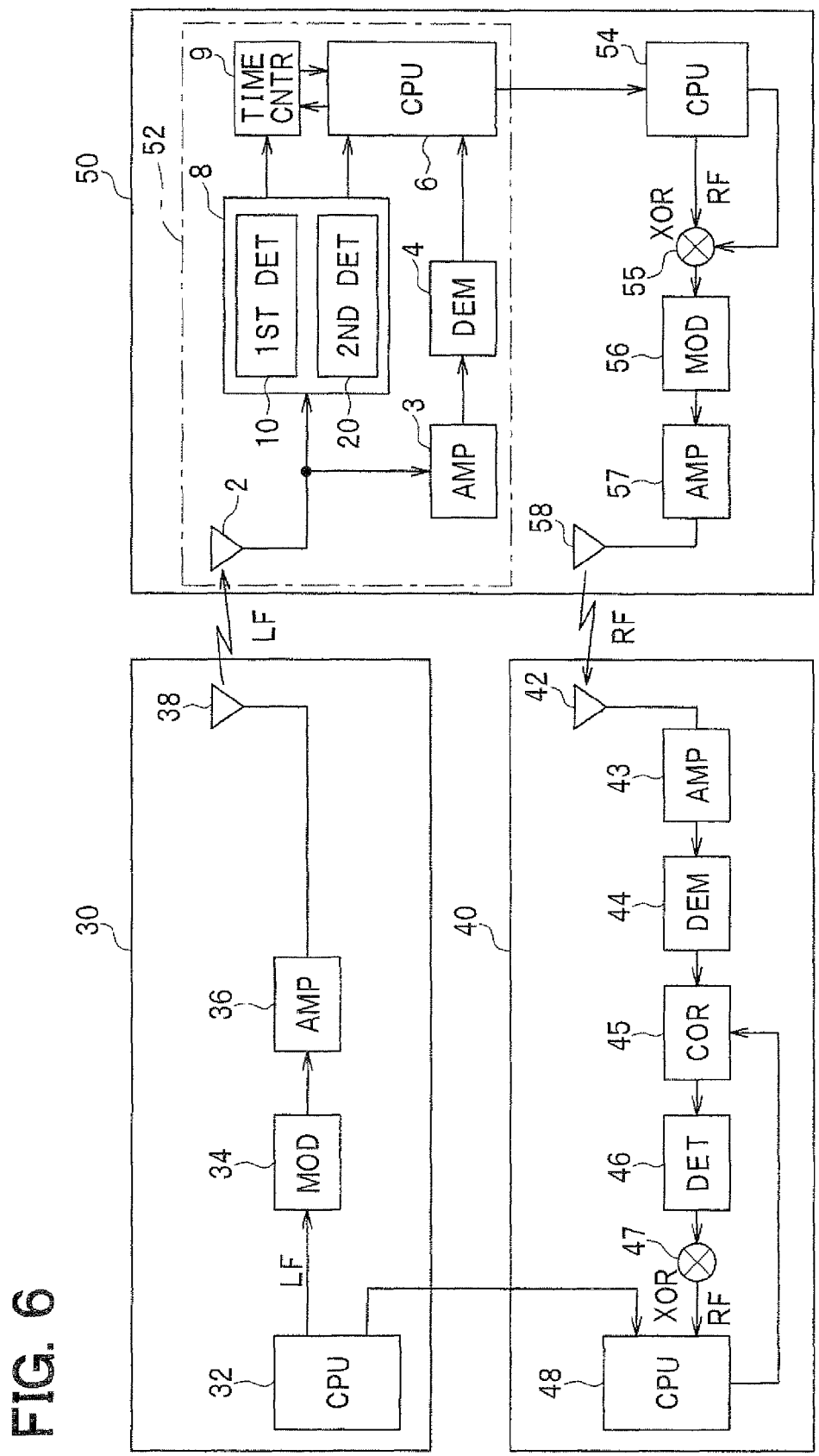
FIG. 6 is a block diagram showing a communications system of an electronic key system, in which the radio signal receiver device is incorporated.

The radio signal receiver device may be incorporated as a radio signal receiver device 52 in a mobile device 50 for an electronic key system of a vehicle as shown in FIG. 6. In this system, when data is transmitted from an in-vehicle radio signal transmitter device 30, the time of transmitting response data from the mobile device 50 is controlled to generally the same time so that the time required for an in-vehicle radio signal receiver device 40 to receive the response data may be shortened.

This electronic key system has a smart entry function and a remote keyless entry function. According to the smart entry function, when a user carrying the mobile device 50 as an authorized one enters or leaves a radio communications area of the vehicle, doors of the vehicle are automatically unlocked and locked, respectively, for example. According to the remote keyless entry function, doors of the vehicle are unlocked or locked in correspondence to manipulation of buttons of the mobile device 50 by a user.

The in-vehicle transmitter device 30 is for transmitting a radio signal in a low frequency band (LF) to the mobile device 50. The in-vehicle radio signal receiver device 40 is for receiving a radio signal in a radio frequency band (RF) from the mobile device 50. The mobile device 50 is configured to transmit the radio signal in the RF band by using a spread spectrum method.

The transmitter device 30 and the radio signal receiver device 40 are connected to a body ECU (not shown), which is configured to control lock/unlock of vehicle doors in a conventional manner.

The radio signal transmitter device 30 includes a microcomputer 32, a modulator 34, an amplifier 36, a transmitter antenna 38 and the like. The microcomputer 32 is configured to output LF data including a synchronization signal. The modulator 34 is configured to modulate a carrier wave in the LF band by the LF data of the microcomputer 32 and generate a LF transmission signal.

The amplifier 36 includes an amplifier circuit, which amplifies the LF transmission signal to a predetermined transmission level, and a filter, which filters out unnecessary signal components (noise or the like) from the LF transmission signal. The LF transmission signal amplified and filtered is transmitted from the transmitter antenna 38 as a LF radio signal. The microcomputer 32 is configured to apply a synchronization signal to the radio signal receiver device 40 at the time of outputting the LF data to the modulator 34.

The mobile device 50 includes, in addition to the radio signal receiver device 52 shown in FIG. 1, a microcomputer 54, an exclusive-OR (XOR) operation circuit 55, a modulator 56, an amplifier 57, a transmitter antenna 58 and the like.

The receiver antenna 2 of the radio signal receiver device 52 receives the LF radio signal transmitted from the radio signal transmitter device 30 of the vehicle, and the received signal is amplified by the amplifier 3 and demodulated by the demodulator 4.

When the received signal of the receiver antenna 2 is detected by the first detector circuit 10, the time counter 9 starts to count time. When the received signal of the receiver antenna 2 is detected by the second detector circuit 20, the microcomputer 6 starts up to operate.

The microcomputer 6 sets a transmission time of response data in response to demodulated data (received data) inputted from the demodulator 4 as an output time of a transmission command by executing the start-time processing shown in FIG. 3. At this output time, the microcomputer 6 outputs the transmission command to the microcomputer 54, so that the response data (RF data) corresponding to the received data is transmitted from the transmitter antenna 58.

When the microcomputer 6 receives the transmission data (LF data) of the radio signal transmitter device 30 during operation, the microcomputer 6 sets the output time of the transmission command in correspondence to a synchronization signal transmitted with the LF data from the radio signal transmitter device 30 and outputs the transmission command of the response data to the microcomputer 54. Thus, the response data (RF data) corresponding to the received data is outputted from the microcomputer 54.

The microcomputer 54 starts to output the RF data, which is the response data to the received data, and a spread code, when the transmission command is received from the microcomputer 6. The response data and the spread code outputted from the microcomputer 54 are inputted to the XOR operation circuit 55. An output signal of the XOR operation circuit 55 is modulated by the modulator 56, amplified by the amplifier 57 and applied to the transmitter antenna 58. Thus, the transmitter antenna 58 transmits the RF radio signal by the spread spectrum method.

The microcomputer 54 also starts outputting an RF data and a spread code so that a RF radio signal is transmitted in the spread spectrum method from the transmitter antenna 58, when a command signal for locking/unlocking the vehicle doors is inputted by the user's manipulation on the buttons provided on the mobile device 50. In this case, the microcomputer 54 generates the RF data in correspondence to the command signal inputted by the button manipulation.

The radio signal receiver device 40 includes a receiver antenna 42, an amplifier 43, a demodulator 44, a correlator 45, a synchronization detector 46, an XOR operation circuit 47, a microcomputer 48 and the like. The RF radio signal transmitted from the mobile device 50 is received by the receiver antenna 42, amplified by the amplifier 43, demodulated by the demodulator 44 and inputted into the correlator 45. The correlator 45 is formed of a sliding correlator, a matched filter or the like, for synchronous capture. The received data (RF data) demodulated by the demodulator 44 is captured synchronously by the correlator 45 and the synchronization detector 46, and restored or decoded by the XOR operation circuit 47.

The microcomputer 48 receives the restored RF data and outputs a control command corresponding to the restored RF data is outputted to the body ECU, which responsively locks or unlocks the vehicle doors or the like.

When the RF radio signal of the mobile device 50 is received by the radio signal receiver device 40, the microcomputer 48 causes the correlator 45 to perform synchronous capture by using the same spread code as the spread code outputted from the microcomputer 54 of the mobile device 50. When the synchronization signal of the transmitter device 30 is inputted at the time of transmission of the LF radio signal from the transmitter device 30, the microcomputer 48 estimates the transmission start time of the RF radio signal from the mobile device 50 based on the synchronization signal, and sets a period of the spread code used for restoring the RF data.

According to this electronic key system, when the mobile device 50 transmits the response data (RF data) in response to the transmission data (LF data) transmitted from the transmitter device 30, the output time of the RF data and the spread code is set based on the synchronization signal transmitted with the LF data from the transmitter device 30. As a result, it is made possible for the radio signal receiver device 40 to accurately estimate the transmission start time of the RF radio signal of the mobile device 50 based on the synchronization signal inputted from the transmitter device 30.

According to this electronic key system, therefore, the microcomputer 48 greatly reduces control amount of the correlator 45. Particularly, since the correlator 45 need not be controlled if variation in the detection time of the first detector circuit 10 is very small, reception of the RF data can be started quickly or at the earlier time.

Further, the radio signal receiver device 52 is provided in the mobile device 50, and the output time of the RF data and the spread code is determined by detecting the transmission start time of the LF radio signal of the transmitter device 30 at a time immediately after the microcomputer 6 of the radio signal receiver device 52 is started up. Therefore, even when the microcomputer 6 is in the sleep state and cannot detect the synchronization signal at the time of receiving the LF radio signal, the RF data can be received speedily by setting the output time of the RF data and the spread code of the microcomputer 54 to the same time as the output time of the spread code used to restore the RF data from the RF radio signal by the radio signal receiver device 40.

What is claimed is:

1. A radio signal receiver device comprising:

a receiver antenna for receiving a radio signal transmitted from a radio signal transmitter device;

restoring means configured to restore, by processing a received signal produced by the receiver antenna, data transmitted from the radio signal transmitter and included in the received signal;

control means configured to execute control processing in correspondence to transmitted data restored by the restoring means;

first detection means configured to detect reception of the radio signal based on a signal level of the received signal of the receiver antenna;

second detection means configured to have a radio signal detection sensitivity lower than that of the first detection means and to start up the control means by detecting reception of the radio signal based on a signal level of the received signal at a later time than the first detection means;

time difference counting means configured to count a time difference between detections of the reception of the radio signal by the first detection means and the second detection means; and the control means being configured to detect a reception start time of the radio signal by the receiver antenna based on the time difference counted by the time difference counting means, after being started up by the second detection means, and execute the control processing based on the reception start time.

2. The radio signal receiver device according to claim 1, wherein:

each of the first detection means and the second detection means include a capacitor, a semiconductor element, which charges the capacitor by wave-detecting and rectifying the received signal of the receiver antenna, and a comparator for determining the reception of the radio signal by the receiver antenna when a charge voltage of the capacitor exceeds a threshold voltage;

the first detection means is provided between the receiver antenna and the second detection means as a pre-stage of the second detection means; and the capacitor of the first detection means has a smaller capacitance than the capacitor of the second detection means.

3. The radio signal receiver device according to claim 1, wherein:

each of the first detection means and the second detection means include, as common circuit elements, a capacitor and a semiconductor element, which charges the capacitor by wave-detecting and rectifying the received signal of the receiver antenna, and is configured to determine the reception of the radio signal by the receiver antenna when a charge voltage of the capacitor exceeds a threshold voltage;

the threshold voltage of the first detection means is lower than that of the second detection means.

4. The radio signal receiver device according to claim 1, wherein:

the control means is configured to execute, as the control processing, response processing for transmitting response data in correspondence to the transmitted data after elapse of a predetermined time from the reception start time, when the reception start time of the radio signal is detected based on the time difference counted by the time difference counting means.

5. The radio signal receiver device according to claim 2, wherein:

the control means is configured to execute, as the control processing, response processing for transmitting response data in correspondence to the transmitted data after elapse of a predetermined time from the reception start time, when the reception start time of the radio signal is detected based on the time difference counted by the time difference counting means.

6. The radio signal receiver device according to claim 3, wherein:

the control means is configured to execute, as the control processing, response processing for transmitting response data in correspondence to the transmitted data after elapse of a predetermined time from the reception start time, when the reception start time of the radio signal is detected based on the time difference counted by the time difference counting means.

* * * * *